(12) United States Patent
Park

(10) Patent No.: US 11,558,738 B2
(45) Date of Patent: Jan. 17, 2023

(54) PRIVACY PROTECTION METHOD AND APPARATUS FOR MOBILE TERMINAL

(71) Applicant: Samsung Electronics Co., Ltd., Suwon-si (KR)

(72) Inventor: Sang Ho Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/988,538

(22) Filed: May 24, 2018

(65) Prior Publication Data

US 2018/0270652 A1     Sep. 20, 2018

Related U.S. Application Data

(63) Continuation of application No. 15/811,166, filed on Nov. 13, 2017, now Pat. No. 9,986,429, which is a continuation of application No. 13/303,919, filed on Nov. 23, 2011, now Pat. No. 9,820,143.

(30) Foreign Application Priority Data

Dec. 6, 2010  (KR) ........................ 10-2010-0123577

(51) Int. Cl.
*H04W 12/02*     (2009.01)
*H04W 4/12*      (2009.01)

(52) U.S. Cl.
CPC .............. *H04W 12/02* (2013.01); *H04W 4/12* (2013.01)

(58) Field of Classification Search
CPC ................................. H04W 12/02; H04W 4/12

USPC .......................... 455/411, 415, 417; 709/206
See application file for complete search history.

(56) References Cited

U.S. PATENT DOCUMENTS

| 8,126,017 | B1 * | 2/2012 | Zave ................. H04L 29/12584 |
| | | | 370/475 |
| 8,782,149 | B2 | 7/2014 | Lester et al. |
| 9,161,187 | B2 * | 10/2015 | Cai ......................... H04W 4/14 |
| 2004/0015547 | A1 | 1/2004 | Griffin et al. |
| 2005/0020318 | A1 | 1/2005 | Yomoda |
| 2006/0052091 | A1 | 3/2006 | Onyon et al. |

(Continued)

FOREIGN PATENT DOCUMENTS

| EP | 1 535 141 B1 | 4/2016 |
| KR | 10-2001-0073430 A | 8/2001 |

(Continued)

*Primary Examiner* — Chuck Huynh
(74) *Attorney, Agent, or Firm* — Jefferson IP Law, LLP

(57) ABSTRACT

A privacy protection method and apparatus for a mobile terminal are provided. The method includes specifying basic information, privacy protection indication, and fictitious information of a contact item to be recorded in a contact list, determining, when a contact is received from an external terminal, whether a privacy protection function is activated for the external terminal, and outputting, when the privacy protection function is activated for the external terminal, a contact reception screen and a contact handling screen that include pre-specified fictitious information of the external terminal and exclude pre-specified basic information thereon. As a result, when a contact is received from a counterpart, information on the counterpart can be prevented from being displayed on the screen. Hence, it is possible to prevent inadvertent disclosure of counterpart information.

12 Claims, 10 Drawing Sheets

(d)

(e)

(56) References Cited

U.S. PATENT DOCUMENTS

| | | | |
|---|---|---|---|
| 2007/0032225 A1* | 2/2007 | Konicek | H04W 4/14 |
| | | | 455/417 |
| 2007/0120952 A1 | 5/2007 | Kim | |
| 2007/0182811 A1 | 8/2007 | Rockefeller et al. | |
| 2007/0206752 A1 | 9/2007 | Nguyen et al. | |
| 2008/0250066 A1* | 10/2008 | Ekstrand | H04M 1/2757 |
| 2008/0256201 A1 | 10/2008 | Flowers et al. | |
| 2010/0086111 A1 | 4/2010 | Gruchala et al. | |
| 2010/0216440 A1* | 8/2010 | Heikkila | H04M 1/575 |
| | | | 455/415 |
| 2011/0173268 A1* | 7/2011 | Cai | H04L 51/56 |
| | | | 709/204 |
| 2012/0115435 A1 | 5/2012 | Oren | |

FOREIGN PATENT DOCUMENTS

| | | |
|---|---|---|
| KR | 10-2007-0001299 A | 1/2007 |
| KR | 10-2007-0030562 A | 3/2007 |
| KR | 10-2007-0071389 A | 7/2007 |
| KR | 10-0798139 B1 | 1/2008 |

* cited by examiner

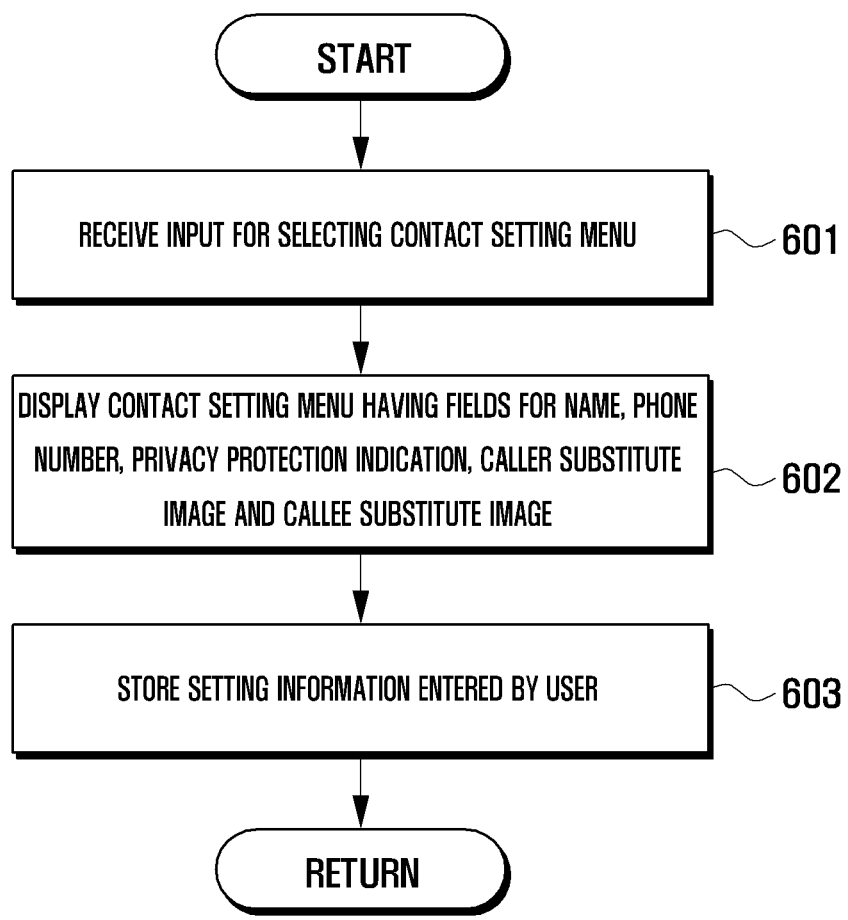

FIG. 7A
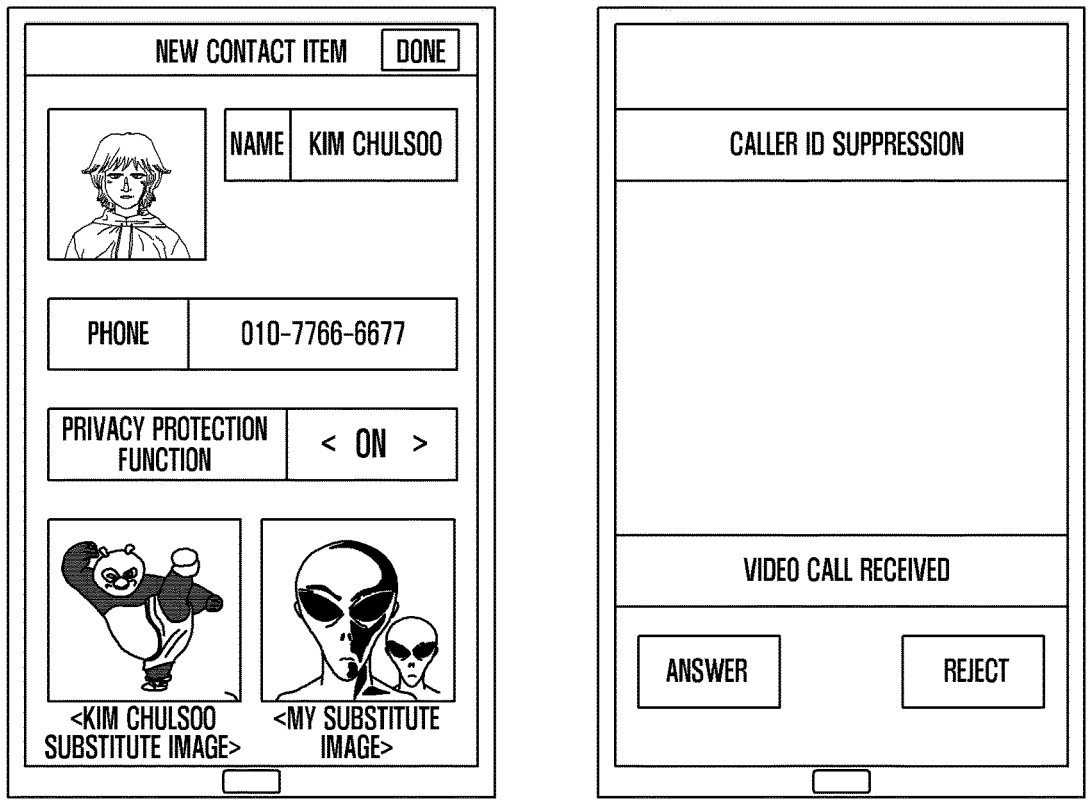
(a) (b)
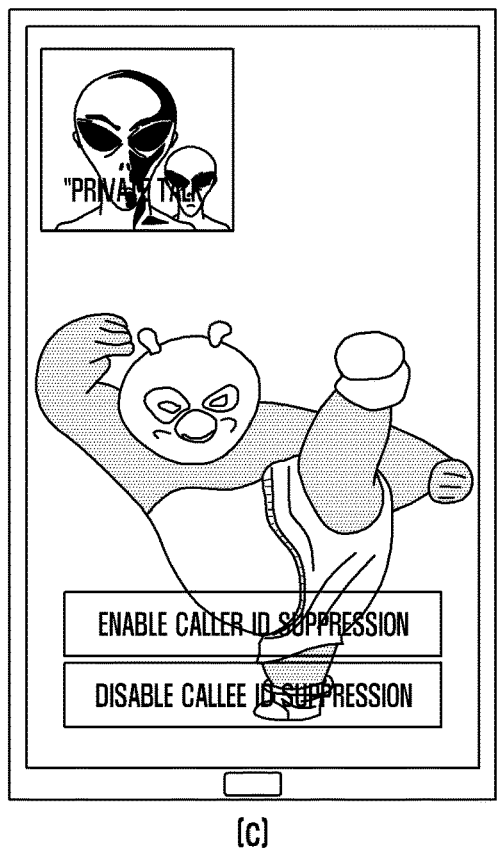
(c)

FIG. 7B
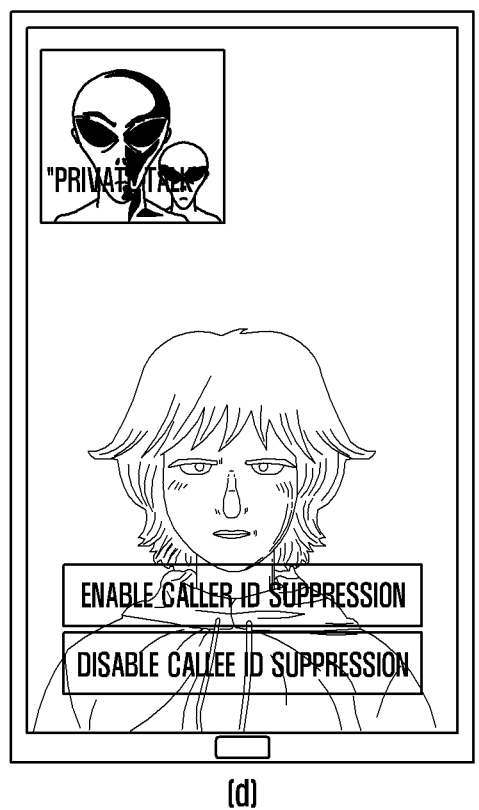
(d)
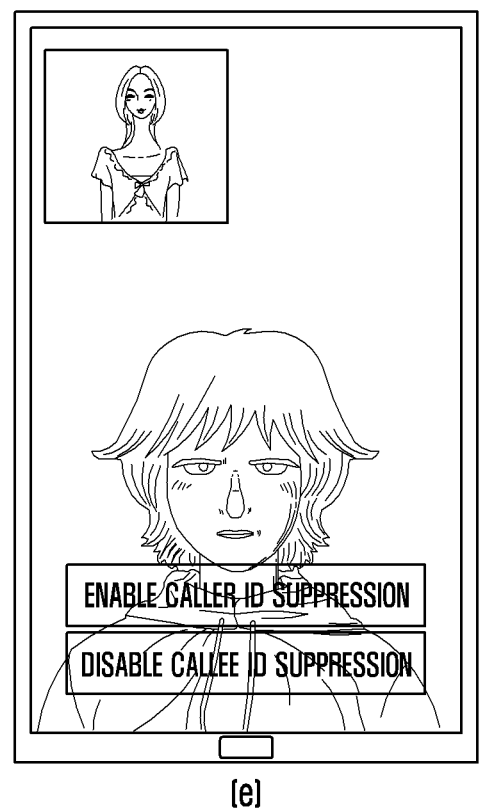
(e)

PRIVACY PROTECTION METHOD AND APPARATUS FOR MOBILE TERMINAL

PRIORITY

This application is a continuation application of prior application Ser. No. 15/811,166, filed on Nov. 13, 2017, which is an continuation application of prior application Ser. No. 13/303,919, filed on Nov. 23, 2011, which has issued as U.S. Pat. No. 9,820,143 on Nov. 14, 2017 and claimed the benefit under 35 U.S.C. § 119(a) of a Korean patent application filed on Dec. 6, 2010 in the Korean Intellectual Property Office and assigned Serial No. 10-2010-0123577, the entire disclosure of which is hereby incorporated by reference.

BACKGROUND OF THE INVENTION

1. Field of the Invention

The present invention relates to privacy protection for a mobile terminal. More particularly, the present invention relates to a privacy protection method and apparatus for a mobile terminal that prevent information regarding a counterpart user from being leaked to others.

2. Description of the Related Art

With rapid popularization, mobile terminals have become a necessity of modern life. In terms of functionality, mobile terminals have evolved into multimedia communication devices that can provide basic voice call services, data transmission services, and supplementary services.

When a mobile terminal receives a contact such as a call, a Short Message Service (SMS) message, a Multimedia Message Service MMS) message, or an e-mail, it also receives caller/sender identification information. For a call, an SMS message, or an MMS message, the caller/sender identification information may be the phone number of the caller (i.e., Caller ID). And for an e-mail, the caller/sender identification information may be the e-mail address of the sender.

When a contact is received, a mobile terminal determines whether identification information of the caller or sender is stored, and displays, when the identification information of the caller or sender is stored, stored basic information of the caller or sender corresponding to the identification information. For example, when a call is received, the mobile terminal may determine whether the phone number of the caller is stored, and display, when the phone number of the caller is stored, the stored name of the caller corresponding to the phone number.

In the course of using a mobile terminal, the user may wish not to disclose their contacts to others. However, when a contact is received, a regular mobile terminal displays the phone number and/or name of the counterpart. Hence, information on the counterpart may be inadvertently disclosed to others.

During a video call, the user may wish that the image of the user that is seen by the counterpart user is not disclosed to others. In this case, the user may wish that an image other than the image of the user is seen by the counterpart. However, a regular mobile terminal may fail to provide this function.

SUMMARY OF THE INVENTION

Aspects of the present invention are to address the above-mentioned problems and/or disadvantages and to provide at least the advantages described below. Accordingly, an aspect of the present invention is to provide a privacy protection method for a mobile terminal that prevents information regarding a counterpart in contact with the user of the mobile terminal from being leaked to others.

Another aspect of the present invention is to provide a privacy protection method for a mobile terminal that prevents information regarding the user of the mobile terminal from being leaked to others.

Another aspect of the present invention is to provide an apparatus implementing the above method.

In accordance with an aspect of the present invention, a method of privacy protection for a mobile terminal is provided. The method includes specifying basic information, privacy protection indication, and fictitious information of a contact item to be recorded in a contact list, determining, when a contact is received from an external terminal, whether a privacy protection function is activated for the external terminal, and outputting, when the privacy protection function is activated for the external terminal, a contact reception screen and a contact handling screen that include pre-specified fictitious information of the external terminal and exclude pre-specified basic information thereon.

In accordance with another aspect of the present invention, a mobile terminal supporting privacy protection is provided. The mobile terminal includes a storage unit for storing a contact list composed of basic information, privacy protection indication, and fictitious information for each contact item, a wireless communication unit for receiving a contact from an external terminal, a control unit for determining whether a privacy protection function is activated for the external terminal, and a display unit for displaying, when the privacy protection function is activated for the external terminal, pre-specified fictitious information of the external terminal excluding pre-specified basic information thereon.

In an exemplary implementation of the present invention, when a contact is received from a counterpart, information of the counterpart may be not displayed. Hence, it is possible to prevent inadvertent leakage of information on the counterpart to others. In addition, during a video call, a substitute image, instead of the captured image of the user, may be sent to the counterpart. Hence, it is also possible to prevent leakage of information of the user to others.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 is a flowchart of a procedure for setting a privacy protection function according to an exemplary embodiment of the present invention; and FIGS. 7A and 7B illustrate screen representations of a mobile terminal according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the word "contact" corresponds to communication or information transmission between a user and another user via means such as a call, a Short Message Service (SMS), a Multi-media Message Service (MMS), and e-mail.

"Basic information" of a contact item may be a name, a phone number and an e-mail address. When a contact item is recorded, the basic information thereof is entered by default.

"Fictitious information" of a contact item is supplementary information entered when the privacy protection function is set, and may be a nickname, a ringtone, a vibration pattern, and the like. In an exemplary implementation, during a video call, fictitious information may be a substitute image of the caller to be displayed on the called mobile terminal or a substitute image of the callee to be sent to the calling mobile terminal.

"Privacy-protected contact details" refer to details of a contact with a counterpart for whom the privacy protection function is activated. "Regular contact details" refer to details of a contact with a counterpart for whom the privacy protection function is deactivated.

The mobile terminal of the present invention may be a second generation terminal such as a Code Division Multiple Access (CDMA) terminal or a Global System for Mobile communications (GSM) terminal, or be a third generation terminal such as a Wideband Code Division Multiple Access (WCDMA) terminal.

Figure 1:
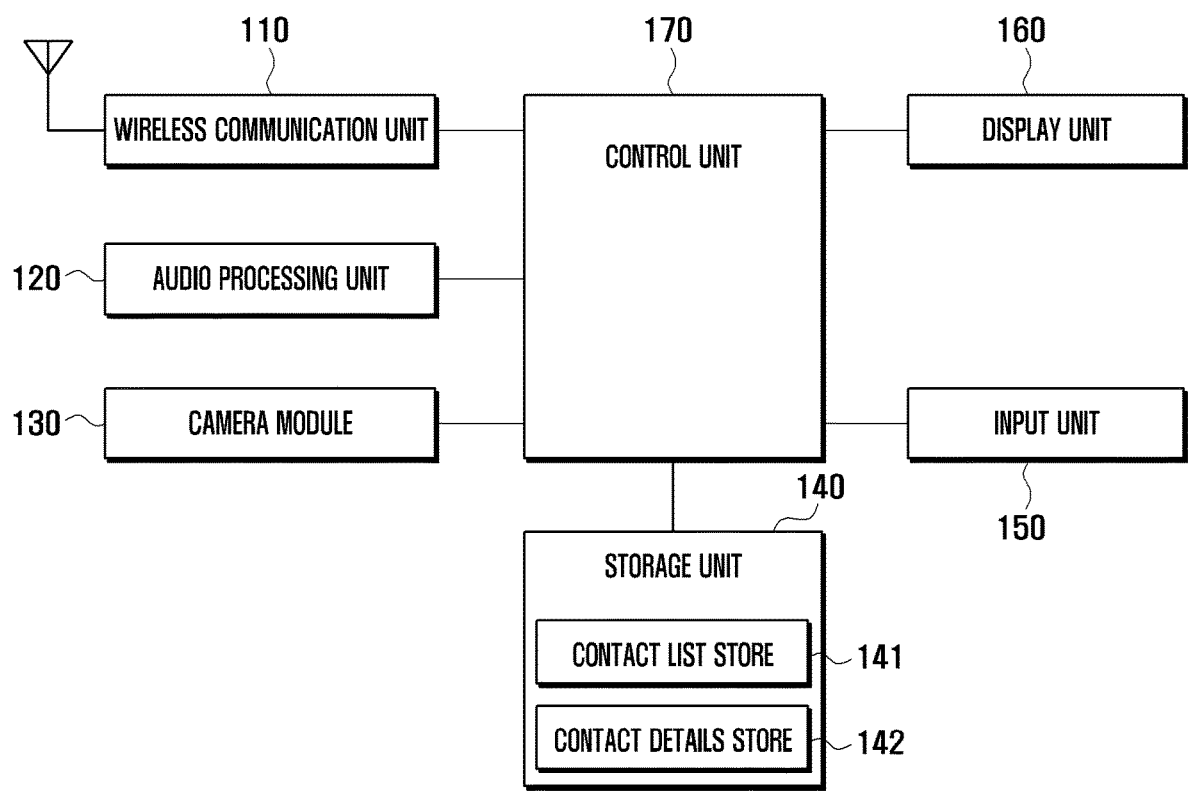
FIG. 1 is a block diagram of a mobile terminal according to an exemplary embodiment of the present invention.

FIG. 1 is a block diagram of a mobile terminal according to an exemplary embodiment of the present invention.

Referring to FIG. 1, the mobile terminal includes a wireless communication unit 110, an audio processing unit 120, a camera module 130, a storage unit 140, an input unit 150, a display unit 160, and a control unit 170.

The wireless communication unit 110 sends and receives data for wireless communication of the mobile terminal. The wireless communication unit 110 may include a Radio Frequency (RF) transmitter for upconverting the frequency of a signal to be transmitted and amplifying the signal, and a radio frequency receiver for low-noise amplifying a received signal and downconverting the frequency of the signal. The wireless communication unit 110 may receive data through a wireless channel and forward the received data to the control unit 170, and may transmit data from the control unit 170 through the wireless channel. More particularly, the wireless communication unit 110 receives a contact such as a call, an SMS message, an MMS message or an e-mail from an external mobile terminal and forwards the received data to the control unit 170. During a video call, the wireless communication unit 110 receives images of the caller from an external mobile terminal and sends images of the user captured by the camera module 130 to the external mobile terminal. When the privacy protection function is activated in relation to the external mobile terminal, the wireless communication unit 110 sends a preset substitute image of the callee to the external mobile terminal.

The audio processing unit 120 may include a coder/decoder (codec). The codec may include a data codec for processing packet data, and an audio codec for processing an audio signal such as a voice signal. The audio processing unit 120 converts a digital audio signal into an analog audio signal through the audio codec and outputs the analog audio signal to a speaker. The audio processing unit 120 also converts an analog audio signal from a microphone into a digital audio signal through the audio codec. More particularly, when the privacy protection function is activated in relation to an external mobile terminal in contact with the mobile terminal, the audio processing unit 120 outputs a ringtone set for privacy protection.

The camera module 130 includes a camera sensor (not shown) for capturing an image of a target object and converting an optical signal corresponding to the captured image into an electrical signal, and a signal processor (not shown) for converting the analog electrical signal into digital data. The camera sensor may be a Charge-Coupled Device (CCD) sensor or a Complementary Metal-Oxide-Semiconductor (CMOS) sensor, and the signal processor may be a Digital Signal Processor (DSP). The camera sensor and the signal processor may be realized as separate entities or as a single entity. More particularly, during a video call, the camera module 130 captures an image of the user and forwards the captured image to the control unit 170.

The storage unit 140 stores programs and data necessary for operation of the mobile terminal, and may include a program region and a data region. The program region may store a control program for controlling the overall operation of the mobile terminal, an Operating System (OS) for booting the mobile terminal, an application program for playing back multimedia content, and application programs necessary for optional functions of the mobile terminal related to photography, sound, and still and moving images. The data region may store data generated in the course of using the mobile terminal, such as still images, moving images, phonebooks, audio data, and the like. More particularly, the storage unit 140 includes a contact list store 141 and a contact details store 142.

The contact list store 141 stores basic information such as phone numbers, names, e-mail addresses, privacy protection indications, and fictitious information such as nicknames and ringtones for privacy protection. In an exemplary implementation, the contact list store 141 may store a caller substitute image to be displayed during a video call with a particular caller, and a callee substitute image to be sent to a calling terminal during a video call. The contact details store 142 stores details of contacts made by the mobile terminal. The contact details store 142 may store privacy-protected contact details and regular contact details. The privacy-protected contact details are details of contacts made in connection with those counterparts whose privacy protection indications of the contact list store 141 are set (the privacy protection function is activated). The regular contact details are details of contacts made in connection with those counterparts whose privacy protection indications of the contact list store 141 are not set (the privacy protection function is deactivated).

The input unit 150 generates a key signal corresponding to user manipulation for controlling the mobile terminal and sends the key signal to the control unit 170. The input unit 150 may include a keypad having alphanumeric and direction keys arranged in a 3x4 or Qwerty layout, or a touch panel. The input unit 150 may further include a button key, a jog key, a wheel key, and the like. The input unit 150 generates an input signal for executing an application (e.g., related to call handling, music playback, reproduction of still and moving images, photographs, Digital Multimedia Broadcasting (DMB) reception or the like) according to user input, and sends the input signal to the control unit 170. More particularly, when recording a contact item, the user may specify a privacy protection indication, a nickname and a ringtone for the contact item.

The display unit 160 may be realized using Liquid Crystal Display (LCDs) devices, Organic Light Emitting Diodes (OLEDs), or Active Matrix Organic Light Emitting Diodes (AMOLEDs). The display unit 160 provides the user with various information such as menus, input data, function-setting data, and the like in a visible form. The display unit 160 may output a boot screen, an idle screen, a menu screen, a call handling screen, and other application screens.

The display unit 160 displays a contact setting menu enabling the user to record a contact item. The contact setting menu may include a name field, a phone number field, a privacy protection indication field, a nickname field, and a ringtone field. Here, the privacy protection indication field, nickname field and ringtone field may be separately grouped as a privacy protection setting menu. In another exemplary embodiment, the contact setting menu may include a name field, a phone number field, a privacy protection indication field, a caller substitute image field, and a callee substitute image field. Here, the privacy protection indication field, caller substitute image field, and callee substitute image field may be separately grouped as a privacy protection setting menu. When a contact is received from a caller for whom the privacy protection function is activated, the display unit 160 displays the stored caller name. When a video call is in progress with a caller for whom the privacy protection function is activated, the display unit 160 displays a pre-stored caller substitute image instead of image information coming from the caller and displays a pre-stored callee substitute image instead of a user image captured by the camera module 130.

The control unit 170 controls overall operations of the components of the mobile terminal. More particularly, the control unit 170 sets privacy protection indications using the contact setting menu according to user input. When the contact setting menu is selected by the user through the input unit 150, the control unit 170 controls the display unit 160 to display the contact setting menu having a name field, a phone number field, a privacy protection indication field, a nickname field and a ringtone field. When the user enters a setting completion key through the input unit 150, the control unit 170 stores information entered by the user in the contact list store 141. When a contact is received from an external terminal through the wireless communication unit 110, the control unit 170 extracts the identification information of the external terminal and determines whether the identification information is stored in the contact list store 141. When the identification information is stored in the contact list store 141, the control unit 170 determines whether the privacy protection function is activated for the external terminal. When the privacy protection function is activated for the external terminal, the control unit 170 controls the display unit 160 to display the nickname stored for the external terminal instead of basic information such as name and phone number of the external terminal. In addition, the control unit 170 may control the display unit 160 to display a phrase such as "Caller ID Suppression" and control the audio processing unit 120 to output a ringtone preset for the external terminal. Here, the ringtone is a ringtone set for privacy protection.

The control unit 170 handles the call from the external terminal through the wireless communication unit 110. When the user enters a call termination command through the input unit 150, the control unit 170 stores details of the call as part of the privacy-protected contact details. When the user enters a command for viewing contact details, the control unit 170 controls the display unit 160 to display the regular contact details without display of the privacy-protected contact details. When the user enters a command for viewing privacy-protected contact details, the control unit 170 controls the display unit 160 to display a password input field, and displays, when a correct password is entered, the privacy-protected contact details. Here, the privacy-protected contact details may be displayed using basic information such as names and phone numbers stored in the contact list store 141 and further using nicknames.

In another exemplary embodiment, when the contact setting menu is selected for privacy protection, the control unit 170 controls the display unit 160 to display the contact setting menu having a name field, a phone number field, a privacy protection indication field, a caller substitute image field, and a callee substitute image field. The control unit 170 stores information entered by the user in the contact list store 141. When a video call connection request is received from an external terminal through the wireless communication unit 110, the control unit 170 extracts the identification information of the external terminal and determines whether the privacy protection function is activated for the external terminal. When the privacy protection function is activated for the external terminal, the control unit 170 controls the display unit 160 to display a video call reception notification without a name or phone number. When the user enters an answer command through the input unit 150, the control unit 170 controls the wireless communication unit 110 to process the video call and controls the display unit 160 to display the caller substitute image, a key for cancelling caller ID suppression and a key for cancelling callee ID suppression. In addition, the control unit 170 controls the wireless communication unit 110 to send a callee substitute image having a notification indicating activation of the privacy protection function to the external terminal. During display of video call images, the control unit 170 displays a callee substitute image having a notification indicating activation of the privacy protection function in a region of the display unit 160. When the key for cancelling caller ID suppression is entered through the input unit 150, the control unit 170 controls the display unit 160 to display images of the caller coming from the external terminal. When the key for cancelling callee ID suppression is entered through the input unit 150, the control unit 170 controls the wireless communication unit 110 to send images of the callee captured by the camera module 130 to the external terminal.

Hereinabove, a description has been given of an exemplary configuration of a mobile terminal supporting a privacy protection method of the present invention. Below, the privacy protection method will be described in more detail.

Figure 2A:
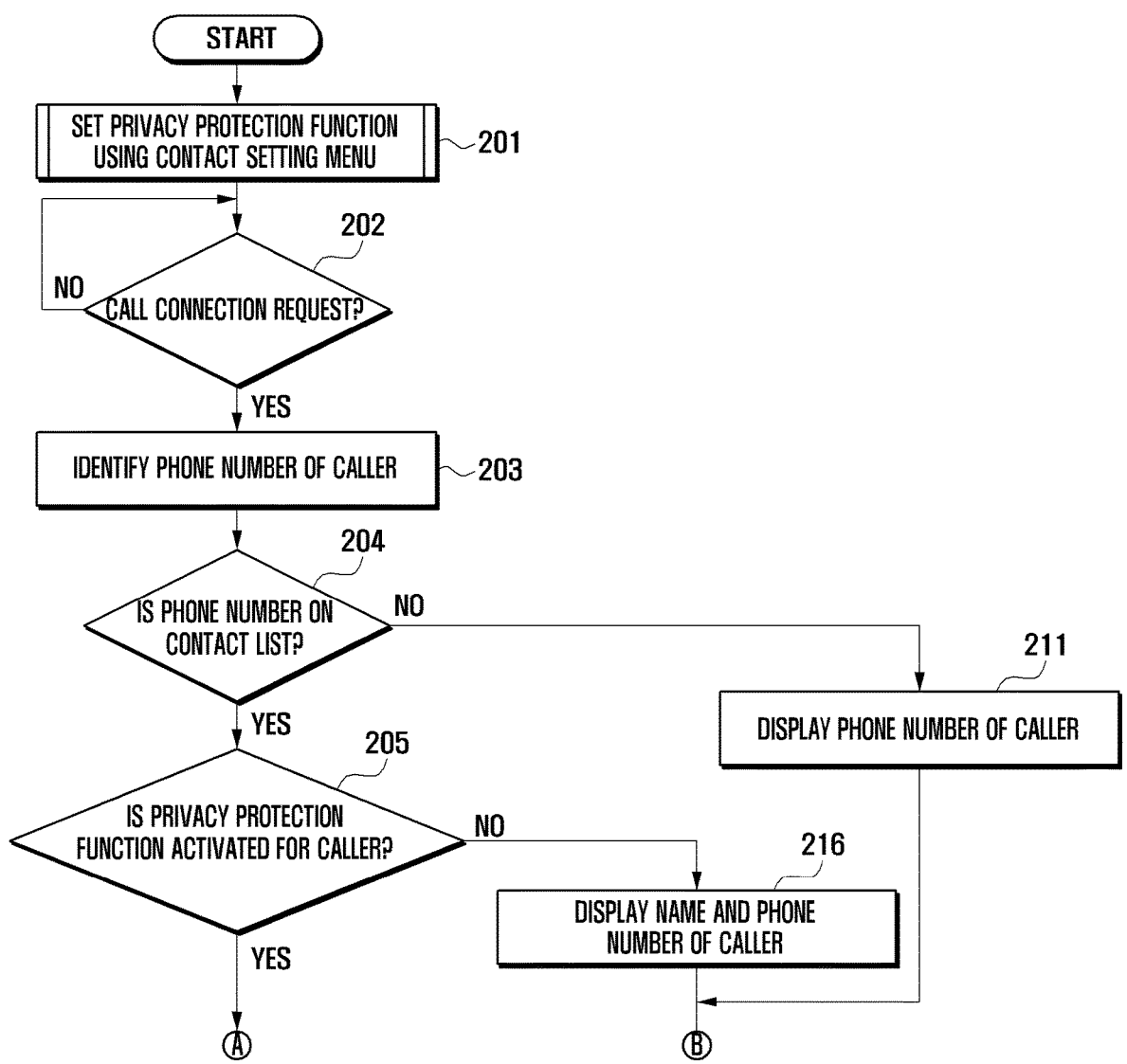
FIGS. 2A and 2B are a flowchart of a privacy protection method for a mobile terminal according to an exemplary embodiment of the present invention.
Figure 2B:
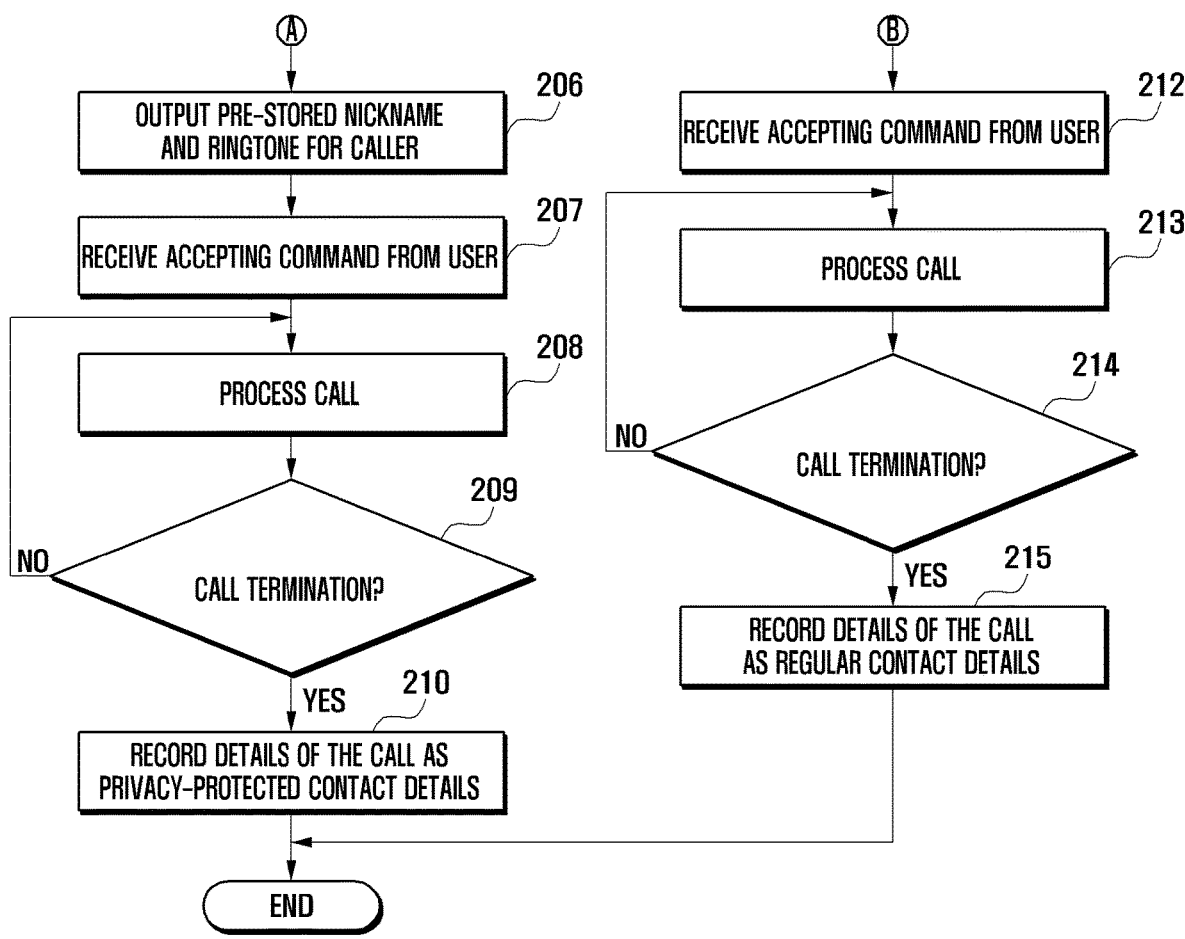

FIGS. 2A and 2B are a flowchart of a privacy protection method for a mobile terminal according to an embodiment of the present invention. In FIGS. 2A and 2B, the contact corresponds to a voice call. However, FIGS. 2A and 2B may also be applicable to an SMS, an MMS and an e-mail.

Referring to FIG. 2A, the control unit 170 of the mobile terminal sets the privacy protection function using a contact setting menu in step 201. The contact management feature of the mobile terminal includes the privacy protection function, and the control unit 170 sets the privacy protection function according to information entered by the user. Step 201 is depicted in more detail in FIG. 3.

Figure 3:
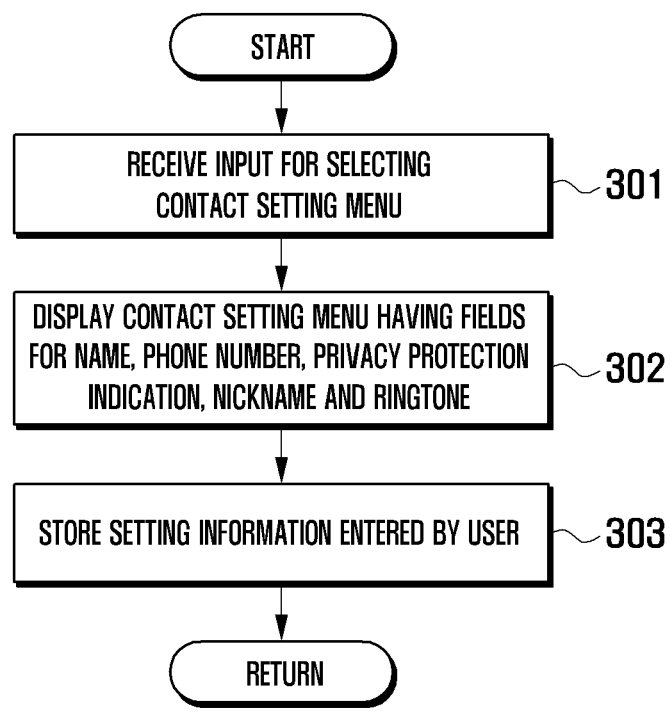
FIG. 3 is a flowchart of a procedure for setting a privacy protection function according to an exemplary embodiment of the present invention.

FIG. 3 is a flowchart of a procedure for setting a privacy protection function according to an exemplary embodiment of the present invention.

Referring to FIG. 3, the control unit 170 receives a user input for selecting the contact setting menu through the input unit 150 in step 301. In an exemplary implementation, the mobile terminal may provide the contact setting menu by default, and the user may select the contact setting menu through the input unit 150 to record a contact item. More specifically, the user may select the contact setting menu through the input unit 150 and enter a key for recording a new contact item. Alternatively, the user may select an existing contact item and enter an edit key.

After selection of the contact setting menu, the control unit 170 controls the display unit 160 to display the contact setting menu having a name field, a phone number field, a privacy protection indication field, a nickname field and a ringtone field in step 302. Here, the privacy protection indication field, nickname field and ringtone field may be separately grouped as a privacy protection setting menu. The contact setting menu may have two ringtone fields: one for a default ringtone and another for privacy protection. At step 302, the control unit 170 may control the display unit 160 to display a name field, a phone number field and a privacy protection indication field first, and display, when the user sets the privacy protection indication to "on", a nickname field and a ringtone field. The control unit 170 may control the display unit 160 to further display a vibration pattern field for privacy protection. The control unit 170 may control the display unit 160 to display one or more of a nickname field, a ringtone field and a vibration pattern field for privacy protection.

Figure 4:
FIG. 4 illustrates screen representations of a mobile terminal according to an exemplary embodiment of the present invention.

FIG. 4 illustrates screen representations of a mobile terminal according to an exemplary embodiment of the present invention.

Referring to FIG. 4, screen [a] illustrates a contact setting menu, which includes a name field, a phone number field, a photograph field, a privacy protection indication field, a nickname field and a ringtone field. Here, the ringtone field is for privacy protection. Another ringtone field may be included in the menu. Although screen [a] includes both a nickname field and a ringtone field, it may include only one thereof or may further include a vibration pattern field. At initial display of the contact setting menu, the privacy protection indication field may be set to "off", and the nickname field and ringtone field may be hidden. After the user sets the privacy protection indication field to "on", the nickname field and ringtone field may be shown. In screen [a], the name field is set to "Kim chulsoo", the phone number field is set to "010-7766-6677", the privacy protection indication field is set to "on", the nickname field is set to "Charles" and the ringtone field is set to "ringtone 1". Of course, it is to be understood that these values are merely for example and sake of description.

Referring back to FIG. 3, the control unit 170 stores setting information entered by the user in the contact list store 141 in step 303. The user enters information using the contact setting menu through the input unit 150. The user may enter at least one of a nickname, ringtone and vibration pattern using the contact setting menu. The information entered by the user is stored in the contact list store 141 and is used when the privacy protection function is activated.

Referring back to FIG. 2A, the control unit 170 determines whether a call connection request is received through the wireless communication unit 110 in step 202. When a call connection request is received, the control unit 170 identifies the phone number of the caller in step 203. The mobile terminal receives a call connection request carrying the phone number of the caller. The control unit 170 determines whether the phone number is stored in the contact list store 141 in step 204. That is, the control unit 170 searches the contact list store 141 for the phone number.

When it is determined in step 204 that the phone number of the caller is stored in the contact list store 141, the control unit 170 determines whether the privacy protection function is activated for the caller in step 205. When it is determined in step 205 that the privacy protection function is activated for the caller, the control unit 170 controls the display unit 160 to display a nickname pre-stored for the caller and controls the audio processing unit 120 to output a ringtone pre-stored for the caller in step 206. Here, the control unit 170 controls an operation not to display a pre-stored name and phone number of the caller. In an exemplary implementation, the control unit 170 may control the display unit 160 to display a nickname pre-stored for the caller and control the audio processing unit 120 to output a default ringtone (a ringtone not for privacy protection). The control unit 170 may control the display unit 160 to display a phrase "Caller ID Suppression" and control the audio processing unit 120 to output a ringtone preset for privacy protection. When a vibration pattern is set for the caller in the contact list store 141, the control unit 170 may control a vibration motor (not shown) to produce vibrations according to the vibration pattern. When a nickname for privacy protection is not specified for the caller, the control unit 170 may control the display unit 160 to display a phrase "Caller ID Suppression".

In FIG. 4, screen [b] depicts a situation when a call connection request is received. In screen [b], for privacy protection, a nickname "Charles" of the caller is displayed and output of a ringtone "ringtone 1" is indicated. In screen [b], the name "Kim chulsoo" and the phone number "010-7766-6677" are not displayed.

When the user enters a command to accept the call request through the input unit 150, the control unit 170 recognizes the command in step 207, and controls the wireless communication unit 110 to establish the call in step 208. During the call, the control unit 170 controls the display unit 160 to display a call handling screen including one of the nickname of the caller or a phrase "Caller ID Suppression" but not including the name or phone number of the caller. The control unit 170 determines whether a call termination command is entered in step 209. When it is determined in step 209 that a call termination command is entered, the control unit 170 records details of the call with the caller as part of privacy-protected contact details in the contact details store 142 in step 210. When a call termination command is not entered, the control unit 170 returns to step 208 and continues call processing through the wireless communication unit 110.

When it is determined in step 204 that the phone number of the caller is not stored in the contact list store 141, the control unit 170 controls the display unit 160 to display the phone number of the caller in step 211. As no information on the caller is stored in the contact list store 141, the control unit 170 controls the display unit 160 to display a call reception indication including the phone number of the caller. When the user enters a command to accept the call request through the input unit 150, the control unit 170 recognizes the command in step 212, and controls the wireless communication unit 110 to establish the call in step 213. During the call, the control unit 170 controls the display unit 160 to display a call handling screen including the phone number of the caller. The control unit 170 determines whether a call termination command is entered in step 214. When it is determined in step 214 that a call termination command is entered, the control unit 170 records details of the call with the caller as part of regular contact details in the contact details store 142 in step 215. When a call termination command is not entered, the control unit 170 returns to step 213 and continues call processing through the wireless communication unit 110.

When it is determined in step 205 that the privacy protection function is not activated for the caller, the control unit 170 controls the display unit 160 to display the name and phone number of the caller in step 216. That is, the control unit 170 controls the display unit 160 to display a call reception indication including the name and phone number of the caller. When the user enters a command to accept the call request through the input unit 150, the control unit 170 recognizes the command in step 212, and controls the wireless communication unit 110 to establish the call in step 213. During the call, the control unit 170 controls the display unit 160 to display a call handling screen including the name and phone number of the caller. When an image of the caller is stored in the contact list store 141, the control unit 170 controls the display unit 160 to further display the caller image. When a call termination command is entered in step 214, the control unit 170 records details of the call with the caller as part of regular contact details in the contact details store 142 in step 215.

In an exemplary implementation, details of a call with a caller for whom the privacy protection function is activated are recorded as part of privacy-protected contact details, and details of a call with a caller for whom the privacy protection function is deactivated are recorded as part of regular contact details. When the user selects a contact detail view menu of the mobile terminal, the control unit 170 controls the display unit 160 to display the regular contact details only. The screen displaying the regular contact details may include a sub-menu for viewing the privacy-protected contact details. When the user selects the sub-menu, the control unit 170 controls the display unit 160 to display a password input field. When a correct password is entered by the user, the control unit 170 controls the display unit 160 to display the privacy-protected contact details. Here, the privacy-protected contact details may include names, phone numbers and nicknames of callers.

In FIG. 4, screen [c] corresponds to a screen displayed when the user selects viewing of the contact details, and screen [d] corresponds to a screen displayed when the user selects viewing of the privacy-protected contact details.

Screen [c] of FIG. 4 illustrates details of calls with counterparts "Kim mijung" and "Shin sinae" for whom the privacy protection function is deactivated (off), and screen [d] illustrates details of calls with a counterpart "Kim chulsoo" for whom the privacy protection function is activated (on). That is, when the user selects the contact detail view menu among main menus of the mobile terminal, only details of calls with counterparts for whom the privacy protection function is deactivated are displayed. Hence, it is possible to prevent inadvertent disclosure of details of calls with counterparts for whom the privacy protection function is activated.

In the case where the contact corresponds to an e-mail, the control unit 170 receives an e-mail from a sending terminal through the wireless communication unit 110 and examines the header of the received e-mail to identify the e-mail address of the sender. The control unit 170 determines whether the e-mail address is stored in the contact list store 141. When the e-mail address is stored in the contact list store 141, the control unit 170 determines whether the privacy protection function is activated in relation to the e-mail address. When the privacy protection function is activated, the control unit 170 controls the display unit 160 to display only the nickname preset for the e-mail address (does not display the e-mail address and name of the sender). Later, when the user selects the e-mail reception box (Inbox), the control unit 170 controls the display unit 160 to display a list of e-mails received only from counterparts for whom the privacy protection function is deactivated. The mobile terminal provides an e-mail menu for privacy protection. When the user selects the privacy-protected e-mail reception box, the control unit 170 controls the display unit 160 to display a password input field. When the user enters the correct password, the control unit 170 controls an operation to display a list of e-mails recorded in the privacy-protected e-mail reception box.

Figure 5A:
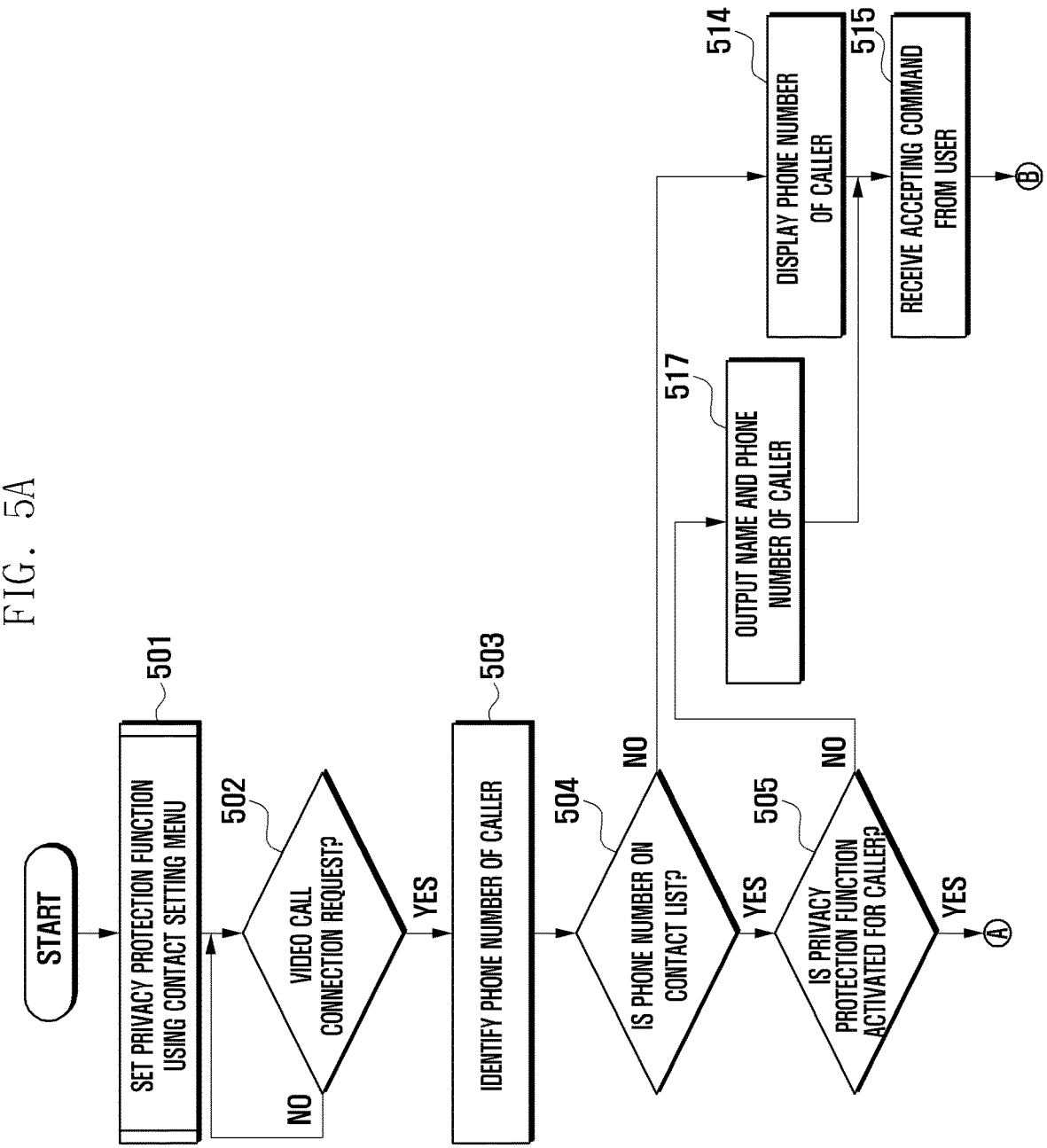
FIGS. 5A and 5B are a flowchart of a privacy protection method for a mobile terminal according to an exemplary embodiment of the present invention.
Figure 5B:
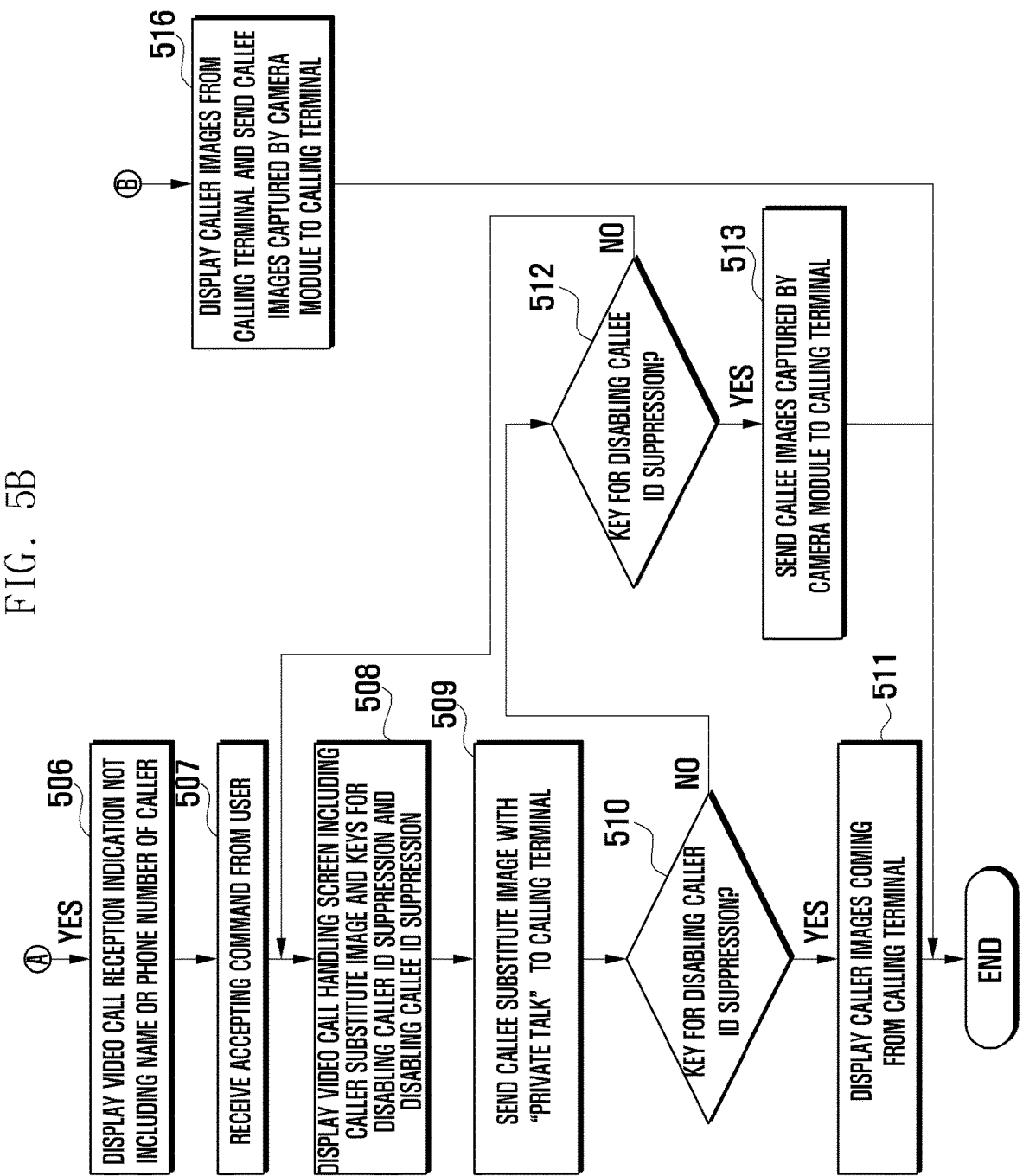

FIGS. 5A and 5B are a flowchart of a privacy protection method for a mobile terminal according to an exemplary embodiment of the present invention. In FIGS. 5A and 5B, the contact corresponds to a video call.

Referring to FIG. 5A, the control unit 170 of the mobile terminal sets the privacy protection function using a contact setting menu in step 501. Step 501 is depicted in more detail in FIG. 6.

FIG. 6 is a flowchart of a procedure for setting a privacy protection function according to an exemplary embodiment of the present invention.

Referring to FIG. 6, the control unit 170 receives a user input for selecting the contact setting menu through the input unit 150 in step 601. The user selects the contact setting menu through the input unit 150 and enters a key for recording a new contact item. Alternatively, the user may select an existing contact item and enter an edit key.

After selection of the contact setting menu, the control unit 170 controls the display unit 160 to display the contact setting menu having a name field, a phone number field, a privacy protection indication field, a caller substitute image field, and a callee substitute image field in step 602. Here, the privacy protection indication field, caller substitute image field, and callee substitute image field may be separately grouped as a privacy protection setting menu. At step 602, the control unit 170 may control the display unit 160 to display a name field, a phone number field and a privacy protection indication field first, and display, when the user set the privacy protection indication to "on", a caller substitute image field and a callee substitute image field. The control unit 170 may control the display unit 160 to display one of a caller substitute image field and a callee substitute image field for privacy protection.

FIGS. 7A and 7B illustrate screen representations of a mobile terminal according to an exemplary embodiment of the present invention.

In FIG. 7A, screen [a] illustrates a contact setting menu, which includes a name field, a phone number field, a photograph field, a privacy protection indication field, a caller substitute image field and a callee substitute image field. Although screen [a] includes both a caller substitute image field ("Kim chulsoo substitute image") and a callee substitute image field ("My substitute image"), it may include only one thereof. At initial display of the contact setting menu, the privacy protection indication field may be set to "off", and the caller substitute image field and the callee substitute image field may be hidden. After the user sets the privacy protection indication field to "on", the caller substitute image field and the callee substitute image field may be shown. In screen [a], the name field is set to "Kim chulsoo", the phone number field is set to "010-7766-6677", the privacy protection indication field is set to "on", the caller substitute image field is set to a character image, and the callee substitute image field is set to another character image.

Referring back to FIG. 6, the control unit 170 stores setting information entered by the user in the contact list store 141 in step 603. The user enters information using the contact setting menu through the input unit 150. The user may specify one or both of a caller substitute image and a callee substitute image using the contact setting menu. The information entered by the user is stored in the contact list store 141, and used when the privacy protection function is activated.

Referring back to FIG. 5A, the control unit 170 determines whether a video call connection request is received through the wireless communication unit 110 in step 502. When it is determined in step 502 that a video call connection request is received, the control unit 170 identifies the phone number of the caller in step 503 and determines whether the phone number is stored in the contact list store 141 in step 504. In an exemplary implementation, the control unit 170 searches the contact list store 141 for the phone number of the caller.

When it is determined in step 504 that the phone number of the caller is stored in the contact list store 141, the control unit 170 determines whether the privacy protection function is activated for the caller in step 505. When it is determined in step 505 that the privacy protection function is activated for the caller, the control unit 170 controls the display unit 160 to display a video call reception indication not including the name or phone number of the caller in step 506. Here, the control unit 170 may control the display unit 160 to display a video call reception indication including phrases "Caller ID Suppression" and "Video Call Reception". When a nickname, ringtone and a vibration pattern are specified for the caller, the control unit 170 may control the display unit 160, the audio processing unit 120 and a vibration motor (not shown) to respectively output the nickname, ringtone and vibration.

In FIG. 7A, screen [b] depicts a situation when a video call connection request is received. In screen [b], a video call reception indication including phrases "Caller ID Suppression" and "Video Call Reception" is displayed. In screen [b], the name "Kim chulsoo" and the phone number "010-7766-6677" of the caller are not displayed.

When the user enters a command to accept the call request through the input unit 150, the control unit 170 recognizes the command in step 507, and controls the wireless communication unit 110 to establish the video call in step 508. At step 508, during the call, the control unit 170 controls the display unit 160 to display a video call handling screen including the caller substitute image and keys for "disabling caller ID suppression" and "disabling callee ID suppression".

The control unit 170 controls the wireless communication unit 110 to send the callee substitute image having a phrase "Private Conversation" to the calling terminal in step 509. That is, the control unit 170 sends the callee substitute image carrying an indication of activation of the privacy protection function to the calling terminal Here, the control unit 170 may display the callee substitute image having a phrase "Private Conversation" in a region of the display unit 160. In an exemplary implementation, step 509 may be performed before step 508.

During the call, the control unit 170 determines whether the key for "disabling caller ID suppression" is entered through the input unit 150 in step 510. When it is determined in step 510 that the key for "disabling caller ID suppression" is entered, the control unit 170 controls the display unit 160 to display caller images coming from the calling terminal in step 511. When it is determined in step 510 that the key for "disabling caller ID suppression" is not entered, the control unit 170 determines whether the key for "disabling callee ID suppression" is entered through the input unit 150 in step 512. When it is determined in step 512 that the key for "disabling callee ID suppression" is entered, the control unit 170 controls the wireless communication unit 110 to send images of the user (callee images) captured by the camera module 130 to the calling terminal in step 513. On the display unit of the calling terminal, the callee substitute image is replaced by callee images. Also, on the display unit 160 of the mobile terminal, the callee substitute image is replaced by callee images.

When it is determined in step 504 that the phone number of the caller is not stored in the contact list store 141, the control unit 170 controls the display unit 160 to display the phone number of the caller in step 514. That is, the control unit 170 controls the display unit 160 to display a video call reception indication including the phone number of the caller. When the user enters a command to accept the call request, the control unit 170 recognizes the command in step 515 and controls the wireless communication unit 110 to set up the video call in step 516. At step 516, during the video call, the control unit 170 controls the display unit 160 to display caller images coming from the calling terminal and controls the wireless communication unit 110 to send callee images captured by the camera module 130 to the calling terminal. The callee images are displayed in a region of the display unit 160.

When it is determined in step 505 that the privacy protection function is not activated for the caller, the control unit 170 controls the display unit 160 to display the name and phone number of the caller in step 517. That is, the control unit 170 controls the display unit 160 to display a video call reception indication including the name and phone number of the caller. The control unit 170 proceeds to step 515 to continue video call processing.

In FIGS. 7A and 7B, screens [c] to [e] correspond to screens displayed during a video call.

In screen [c] of FIG. 7A, as the privacy protection function is activated for the caller "Kim chulsoo", a preset substitute image is displayed instead of a caller image and callee image. In a region for the callee image, "My substitute image" preset by screen [a] of FIG. 7A and a phrase "Private Conversation" are displayed. In a region for the caller image, "Kim chulsoo substitute image" preset by screen [a] of FIG. 7A is displayed.

Screen [d] of FIG. 7B is a result of entering the key for "disabling caller ID suppression" at screen [c] of FIG. 7A. In screen [d], the image of "Kim chulsoo" from the calling terminal is displayed and the key for "disabling caller ID suppression" is replaced by the key for "enabling caller ID suppression".

Screen [e] of FIG. 7B is a result of entering the key for "disabling callee ID suppression" at screen [d] of FIG. 7B. In screen [e], the user image captured by the camera module 130 is displayed and the key for "disabling callee ID suppression" is replaced by the key for "enabling callee ID suppression".

According to exemplary embodiments of the present invention, when a contact is received from a counterpart, information on the counterpart can be prevented from being displayed on the screen. Hence, it is possible to prevent inadvertent disclosure of counterpart information. In addition, during a video call, a substitute image other than a captured image of the user may be sent to the counterpart. Hence, it is also possible to prevent inadvertent disclosure of user information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable electronic device comprising:
    a memory;
    a communication circuit;
    a touchscreen display; and
    a processor configured to:
        store contact information of a contact, the contact information including a name, a telephone number, and fictitious information of the contact,
        receive a first user input to set a user selectable function for the contact to one of a first setting or a second setting,
        receive a second user input to set at least one of a ringtone or a vibration pattern corresponding to the contact information,
        receive a message from an external electronic device corresponding to the contact,
        if the message is received while the user selectable function is set to the first setting, display a message reception interface, the message reception interface including the message and the fictitious information of the contact, but not including the name and the telephone number of the contact, and output the at least one of the ringtone or the vibration pattern,
        if the message is received while the user selectable function is set to the second setting, display the message reception interface including the message and at least one of the name of the contact or the telephone number of the contact, and
        in response to a user input to display a list of received messages:
            determine whether the user input corresponds to a request to display received messages from contacts corresponding to the first setting or to display received messages from contacts corresponding to the second setting,
            in response to a determination that the user input does not correspond to the request to display received messages from the contacts corresponding to the second setting, display a list of messages received only from contacts corresponding the second setting, and
            in response to a determination the user input corresponds to the request to display received messages from the contacts corresponding to the first setting, display a list of messages received only from contacts corresponding to the first setting, based on a result of a user authentication procedure,
        wherein the at least one of the ringtone or the vibration pattern is set for privacy protection.

2. The portable electronic device of claim 1, wherein the processor is further configured to:
    display a menu regarding the contact, the menu including a name field, a telephone number field, and a nickname field to receive or present at least one of the name, the telephone number, or the nickname,
    receive an input for the nickname with respect to the nickname field,
    receive an input for the telephone number with respect to telephone number field,
    receive an input for the name with respect to the name field,
    receive an input for storing the contact, and
    in response to the input for storing the contact, control the memory to store the contact information including the name, the telephone number and the nickname.

3. The portable electronic device of claim 1, wherein the processor is further configured to:
    receive an input with respect to a nickname while the message is displayed in the message reception interface, and
    display, in response to the receiving of the input, the nickname, the name and the telephone number.

4. The portable electronic device of claim 2,
    wherein the menu further includes an email address field to receive or present an email address, and
    wherein the processor is further configured to:
        receive an input for the email address with respect to the email address field, and
        in response to the input for storing the contact, control the memory to store the contact information including the name, the telephone number, the email address and the nickname.

5. The portable electronic device of claim 1, wherein the processor is further configured to:
    receive an email from the external electronic device corresponding to the contact, and
    display an email reception interface, the email reception interface including the fictitious information of the contact and not including the name or an email address of the contact.

6. The portable electronic device of claim 5, wherein the processor is further configured to:
- receive an input with respect to a nickname while the email is displayed in the email reception interface, and
- display, in response to the receiving of the input, the nickname, the name, and the email address of the contact.

7. A non-transitory machine-readable storage device storing instructions that, when executed by one or more processors, cause the one or more processors to perform operations comprising:
- storing contact information of a contact, the contact information including a name, a telephone number, and fictitious information of the contact;
- receiving a first user input to set a user selectable function to one of a first setting or a second setting;
- receiving a second user input to set at least one of a ringtone or a vibration pattern corresponding to the contact information;
- receiving a message from an external electronic device corresponding to a contact;
- if the message is received while the user selectable function is set to the first setting, displaying a message reception interface, the message reception interface including the message and the fictitious information of the contact, but not including a name and a telephone number of the contact, and outputting the at least one of the ringtone or the vibration pattern;
- if the message is received while the user selectable function is set to the second setting, displaying the message reception interface including the message and at least one of the name of the contact or the telephone number of the contact; and
- in response to a user input to display a list of received messages:
  - determining whether the user input corresponds to a request to display received messages from contacts corresponding to the first setting or to display received messages from contacts corresponding to the second setting,
  - in response to a determination that the user input does not correspond to the request to display received messages from the contacts corresponding to the second setting, displaying a list of messages received only from the contact corresponding the second setting, and
  - in response to a determination the user input corresponds to the request to display received messages from the contacts corresponding to the first setting,
- displaying a list of messages received only from contacts corresponding to the first setting, based on a result of a user authentication procedure,
- wherein the at least one of the ringtone or the vibration pattern is set for privacy protection.

8. The non-transitory machine-readable storage device of claim 7, further comprising instructions that, when executed by the one or more processors, cause the one or more processors to perform operations comprising:
- displaying a menu regarding the contact, the menu including a name field, a telephone number field, and a nickname field to receive or present at least one of the name, the telephone number, or the nickname;
- receiving an input for the nickname with respect to the nickname field;
- receiving an input for the telephone number with respect to the telephone number field;
- receiving an input for the name with respect to the name field;
- receiving an input for storing the contact; and
- in response to the input for storing the contact, controlling a memory to store contact information including the name, the telephone number, and the nickname of the contact.

9. The non-transitory machine-readable storage device of claim 7, wherein the instructions further comprise instructions that, when executed by the one or more processors, cause the one or more processors to perform operations comprising:
- receiving an input with respect to a nickname while the message is displayed in the message reception interface, and
- displaying, in response to the receiving of the input, the nickname, the name and the telephone number of the contact.

10. The non-transitory machine-readable storage device of claim 8,
- wherein the menu further includes an email address field to receive or present an email address, and
- wherein the instructions further comprise instructions that, when executed by the one or more processors, cause the one or more processors to perform operations comprising:
  - receiving an input for the email address with respect to the email address field, and
  - in response to the input for storing the contact, controlling the memory to store the contact information including the name, the telephone number, the email address, and the nickname of the contact.

11. The non-transitory machine-readable storage device of claim 10, wherein the instructions further comprise instructions that, when executed by the one or more processors, cause the one or more processors to perform operations comprising:
- receiving an email from the external electronic device corresponding to the contact; and
- displaying an email reception interface, the email reception interface including the fictitious information of the contact and not including the name or the email address of the contact.

12. The non-transitory machine-readable storage device of claim 11, further comprising instructions that, when executed by the one or more processors, cause the one or more processors to perform operations comprising:
- receiving an input with respect to the nickname while the email is displayed in the email reception interface, and
- displaying, in response to the receiving of the input, the nickname, the name and the email address of the contact.

* * * * *